United States Patent
Otake (10) Patent No.: US 11,025,184 B2
(45) Date of Patent: Jun. 1, 2021

(54) ROTATION ELECTRIC MACHINE CONTROLLER

(71) Applicant: DENSO CORPORATION, Kariya (JP)

(72) Inventor: Hiroyasu Otake, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/507,392

(22) Filed: Jul. 10, 2019

(65) Prior Publication Data

US 2020/0021218 A1    Jan. 16, 2020

(30) Foreign Application Priority Data

Jul. 13, 2018  (JP) .............................. JP2018-133577

(51) Int. Cl.
*H02P 21/22* (2016.01)
*H02P 9/10* (2006.01)
*H02P 21/14* (2016.01)
*H02M 7/44* (2006.01)
*H02P 27/04* (2016.01)
*H02P 6/06* (2006.01)

(52) U.S. Cl.
CPC .............. *H02P 21/14* (2013.01); *H02M 7/44* (2013.01); *H02P 6/06* (2013.01); *H02P 27/04* (2013.01)

(58) Field of Classification Search
CPC .................. H02P 1/00; H02P 8/18; H02P 6/15
See application file for complete search history.

(56) References Cited

U.S. PATENT DOCUMENTS

| | | | |
|---|---|---|---|
| 2011/0025238 A1* | 2/2011 | Ueda ..................... | B62D 5/046 318/400.02 |
| 2016/0204727 A1* | 7/2016 | Fujii ..................... | H02P 27/06 318/400.02 |

FOREIGN PATENT DOCUMENTS

JP    2006-254572 A    9/2006

OTHER PUBLICATIONS

U.S. Appl. No. 16/507,371, filed Jul. 10, 2019, Hiroyasu Otake, et al.

* cited by examiner

*Primary Examiner* — Kawing Chan
*Assistant Examiner* — Charles S Laughlin
(74) *Attorney, Agent, or Firm* — Maschoff Brennan (57) ABSTRACT

A rotation electric machine controller that is applied to a system including a rotation electric machine and a power converter is provided. The rotation electric machine controller includes: a d-axis command value set portion that sets a negative d-axis current command value; and an operation portion that operates the power converter to control a d-axis current to the d-axis current command value. The d-axis command value set portion increases an absolute value of the d-axis current command value in response to that the q-axis parameter is larger than the target value. The d-axis command value set portion decreases the absolute value of the d-axis current command value in response to that the q-axis parameter is less than the target value.

6 Claims, 8 Drawing Sheets

ROTATION ELECTRIC MACHINE CONTROLLER

CROSS REFERENCE TO RELATED APPLICATION

The present application claims the benefit of priority from Japanese Patent Application No. 2018-133577 filed on Jul. 13, 2018. The entire disclosures of all of the above applications are incorporated herein by reference.

TECHNICAL FIELD

The present disclosure relates to a rotation electric machine controller.

BACKGROUND

There is a control device configured to set a d-axis current command value for field weakening control in accordance with d- and q-axis voltage command values of a rotation electric machine.

SUMMARY

The present disclosure provides a rotation electric machine controller that is applied to a system including a rotation electric machine and a power converter. The rotation electric machine controller is configured to set a negative d-axis current command value, and operate the power converter to control a d-axis current to a d-axis current command value.

BRIEF DESCRIPTION OF DRAWINGS

The above and other objects, features, and advantages of the present disclosure will become more apparent from the following detailed description with reference to the accompanying drawings. In the drawings.

DETAILED DESCRIPTION

A control device sets a d-axis current command value for field weakening control in accordance with d- and q-axis voltage command values of a rotation electric machine. The related art describes setting the d-axis current command value necessary for causing torque of the rotation electric machine to reach command torque, in accordance with a difference between the q-axis voltage command value and a square root of a value obtained by subtracting a square of the d-axis voltage command value from a square of a voltage maximum value of a power converter configured to convert power supplied from a power supplier to the rotation electric machine. The d-axis current command value is set to a value equal to or less than zero, and is set to have an absolute value that is increased if the torque of the rotation electric machine is more than the command torque and that is decreased if the torque of the rotation electric machine is less than the command torque.

The inventor of the present application has found the following. The d-axis current command value, which is necessary for causing the torque of the rotation electric machine to reach the command torque, is changeable. The d-axis current command value at the moment thus needs to be changed to reach an appropriate value according to the command torque. A low change rate of the d-axis current command value may fail to cause the torque of the rotation electric machine to increase rapidly and lead to deterioration in torque responsiveness of the rotation electric machine.

The d-axis current command value is increased or decreased in accordance with magnitude relation between the torque of the rotation electric machine and the command torque. Thus, a high change rate of the d-axis current command value may cause hunting of the d-axis current command value and lead to deterioration in torque controllability of the rotation electric machine in a range where the magnitude relation between the torque of the rotation electric machine and the command torque switches.

The present disclosure provides a controller configured to improve torque controllability of a rotation electric machine.

According to one aspect of the present disclosure, a rotation electric machine controller that is applied to a system including a rotation electric machine and a power converter electrically connected to the rotation electric machine is provided. The rotation electric machine controller may include: a d-axis command value set portion that sets a negative d-axis current command value in accordance with a difference between a q-axis parameter that is a q-axis voltage command value of the rotation electric machine or a correlation value of the q-axis voltage command value, and a target value of the q-axis parameter; and an operation portion that is configured to operate the power converter to control a d-axis current to the d-axis current command value, which is set. The d-axis command value set portion may increase an absolute value of the d-axis current command value in response to that the q-axis parameter is larger than the target value. The d-axis command value set portion may decrease the absolute value of the d-axis current command value in response to that the q-axis parameter is less than the target value. The d-axis command value set portion may set the d-axis current command value, causing the d-axis current command value to have a higher change rate in a case where the q-axis parameter is more than the target value by a reference value than in a different case where the q-axis parameter is less than the target value by the reference value.

The rotation electric machine controller according to the present disclosure sets the negative d-axis current command value in accordance with the difference between the q-axis parameter and the target value. Specifically, the controller increases the absolute value of the d-axis current command value when the q-axis parameter is more than the target value, and decreases the absolute value of the d-axis current command value when the q-axis parameter is less than the target value. The controller sets the d-axis current command value such that the change rate of the d-axis current command value is higher in the case where the q-axis parameter is more than the target value by the reference value than in the other case where the q-axis parameter is less than the target value by the reference value. In the case where the q-axis parameter is more than the target value by the reference value, the absolute value of the negative d-axis current command value can thus be increased rapidly at a relatively high change rate and the q-axis parameter can be decreased rapidly to reach the target value. In the other case where the q-axis parameter is less than the target value by the reference value, the absolute value of the negative d-axis current command value can be decreased slowly at a relatively low change rate to inhibit hunting of the d-axis current command value in a range where magnitude relation between the q-axis parameter and the target value switches. This achieves improvement in torque controllability of the rotation electric machine.

FIRST EMBODIMENT

A rotation electric machine control system of a vehicle 100 including a rotation electric machine controller according to a first embodiment will be described below with reference to the drawings. The controller according to the present embodiment configures the rotation electric machine control system of an electric power steering (EPS) device 10 that assists steering by a driver. Incidentally, the rotation electric machine controller may be referred to as a control apparatus for a rotation electric machine. A rotation electric machine may be referred to as a dynamo-electric machine.

Figure 1:
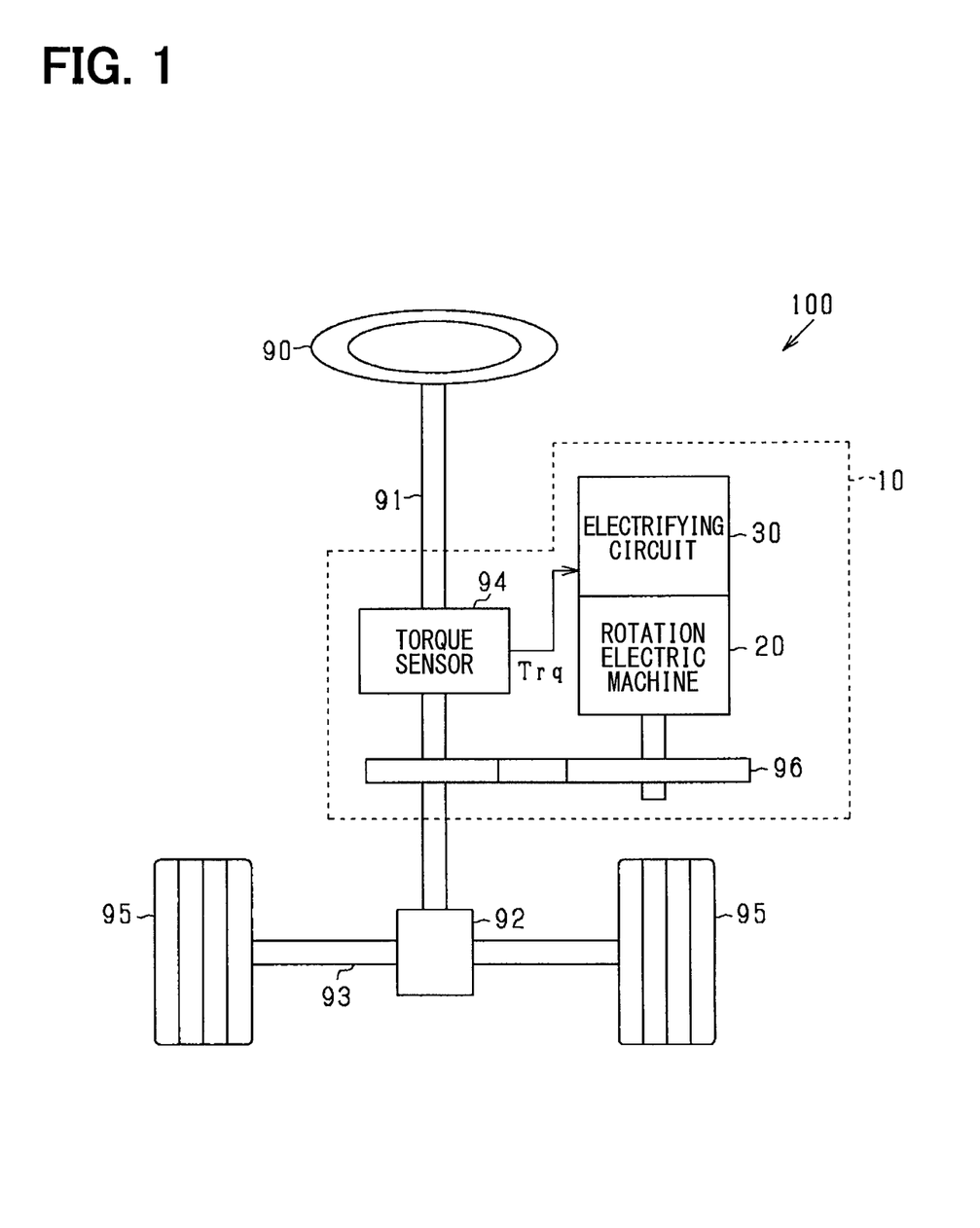
FIG. 1 is a diagram illustrating an entire configuration of an in-vehicle rotation electric machine system.

FIG. 1 depicts the vehicle 100 including a steering wheel 90, a steering shaft 91, a pinion gear 92, a rack shaft 93, and the EPS device 10. The steering shaft 91 is connected to the steering wheel 90. The steering shaft 91 has a distal end provided with the pinion gear 92. The pinion gear 92 engages with the rack shaft 93. The rack shaft 93 has ends each provided with a wheel 95 rotatably coupled via a tie rod or the like. The steering shaft 91 is rotated when a driver rotates the steering wheel 90. The pinion gear 92 converts rotary motion of the steering shaft 91 to linear motion of the rack shaft 93, and the wheels 95 are steered to have a steering angle according to displacement of the rack shaft 93.

The EPS device 10 includes a torque sensor 94, a speed reducer 96, a rotation electric machine 20, and an electrifying circuit 30. The torque sensor 94 is provided at the steering shaft 91, and detects steering torque Trq output from the steering shaft 91. The rotation electric machine 20 generates assist torque according to the steering torque Trq thus detected and a steering direction of the steering wheel 90. The electrifying circuit 30 drive-controls the rotation electric machine 20. The speed reducer 96 is configured to decelerate rotation of a rotary shaft included in a rotor of the rotation electric machine 20 as well as transmit the assist torque to the steering shaft 91.

Figure 2:
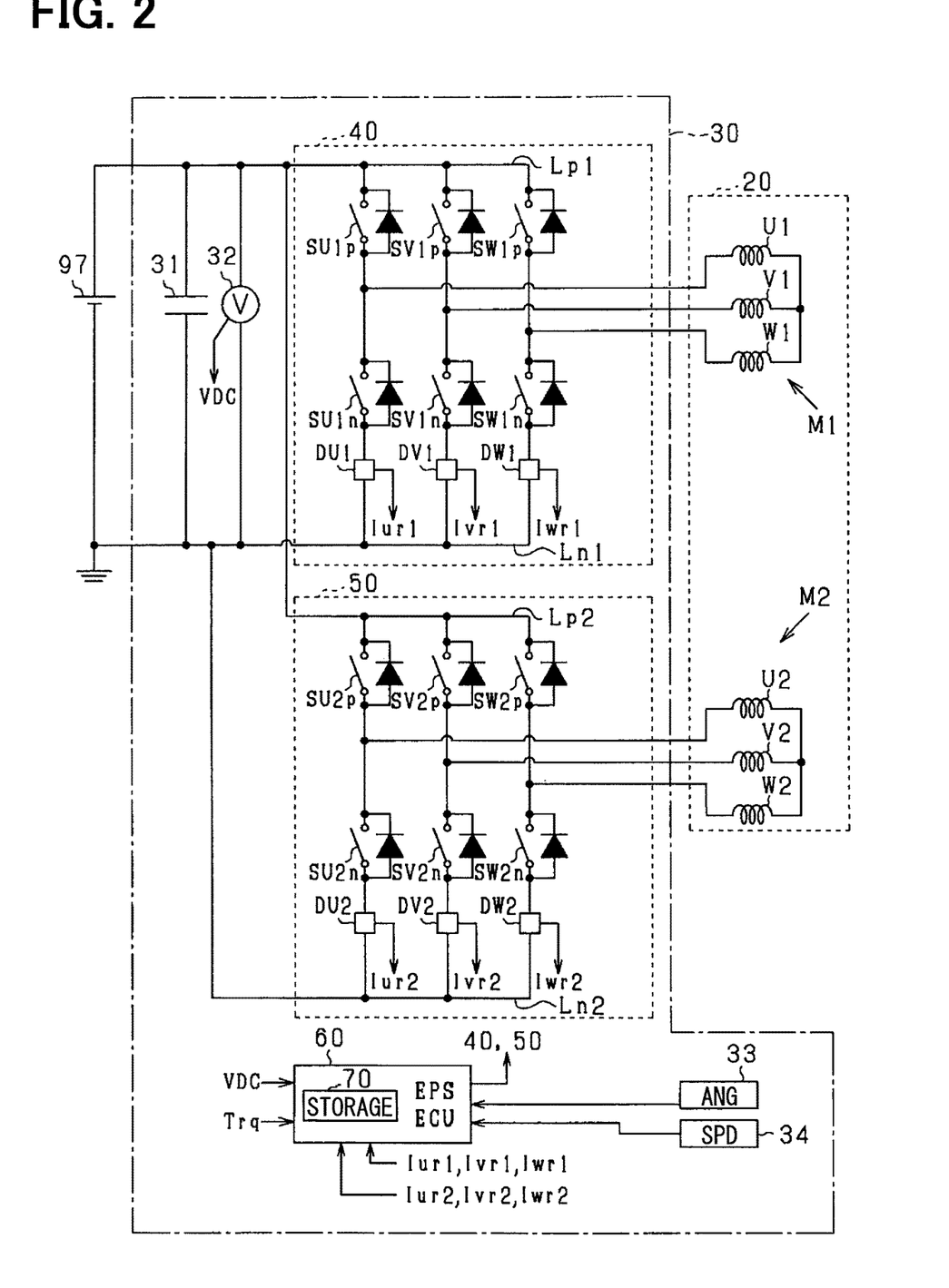
FIG. 2 is a diagram illustrating a configuration of an electrifying circuit and a rotation electric machine.

The rotation electric machine 20 and the electrifying circuit 30 will be described with reference to FIG. 2.

The rotation electric machine 20 may be of a permanent magnet field type or a coil field type. The rotation electric machine 20 includes a stator having a first coil group M1 and a second coil group M2. The first coil group M1 includes a first U-phase coil U1, a first V-phase coil V1, and a first W-phase coil W1 being star-connected, and the second coil group M2 includes a second U-phase coil U2, a second V-phase coil V2, and a second W-phase coil W2 being star-connected. The first U, V, and W-phase coils U1, V1, and W1 have first ends connected to one another at a neutral point. The first U, V, and W-phase coils U1, V1, and W1 are shifted from one another by 120 degrees in terms of an electrical angle θe. The second U, V, and W-phase coils U2, V2, and W2 have first ends connected to one another at a neutral point. The second U, V, and W-phase coils U2, V2, and W2 are shifted from one another by 120 degrees in terms of the electrical angle θe.

The electrifying circuit 30 includes a first inverter 40 and a second inverter 50 each functioning as a power converter. In the first inverter 40, a node between first U-phase upper and lower arm switches SU1$p$ and SU1$n$ is electrically connected to a second end of the first U-phase coil U1. A node between first V-phase upper and lower arm switches SV1$p$ and SV1$n$ is electrically connected to a second end of the first V-phase coil V1. A node between first W-phase upper and lower arm switches SW1$p$ and SW1$n$ is electrically connected to a second end of the first W-phase coil W1. In the second inverter 50, a node between second U-phase upper and lower arm switches SU2$p$ and SU2$n$ is electrically connected to a second end of the second U-phase coil U2. A node between second V-phase upper and lower arm switches SV2$p$ and SV2$n$ is electrically connected to a second end of the second V-phase coil V2. A node between second W-phase upper and lower arm switches SW2$p$ and SW2$n$ is electrically connected to a second end of the second W-phase coil W2.

Each of the switches SU1$p$ to SW2$n$ has only to be configured as a voltage-controlled semiconductor switching element such as an IGBT (insulated gate bipolar transistor) or a MOSFET (metal-oxide-semiconductor field-effect transistor). Each of the switches SU1$p$ to SW2$n$ is anti-parallelly connected to a diode.

The electrifying circuit 30 includes a first high-potential path Lp1, a first low-potential path Ln1, a second high-potential path Lp2, a second low-potential path Ln2, and a capacitor 31. The first U, V, and W-phase upper arm switches SU1$p$, SV1$p$, and SW1$p$ each have a high-potential terminal connected, via the first high-potential path Lp1, to a positive electrode terminal of a battery 97 functioning as a direct-current power source. The first U, V, and W-phase lower arm switches SU1$n$, SV1$n$, and SW1$n$ each have a low-potential terminal connected to a negative electrode terminal of the battery 97 via the first low-potential path Ln1. The negative electrode terminal of the battery 97 is connected to ground. The second U, V, and W-phase upper arm switches SU2$p$, SV2$p$, and SW2$p$ each have a high-potential terminal connected to the positive electrode terminal of the battery 97 via the second high-potential path Lp2 and the first high-potential path Lp1. The second U, V, and W-phase lower arm switches SU2$n$, SV2$n$, and SW2$n$ each have a low-potential terminal connected to the negative electrode terminal of the battery 97 via the second low-potential path Ln2 and the first low-potential path Ln1.

The electrifying circuit 30 includes a current sensor. In the first inverter 40, the low-potential terminals of the first U, V, and W-phase lower arm switches SU1$n$, SV1$n$, and SW1$n$ and the first low-potential path Ln1 are connected by electrical paths provided with first U, V, and W-phase current sensors DU1, DV1, and DW1, respectively. The first U, V, and W-phase current sensors DU1, DV1, and DW1 are configured to detect current flowing through the electrical paths and output the detected current as first U, V, and W-phase current Iur1, Ivr1, and Iwr1, respectively.

In the second inverter 50, the low-potential terminals of the second U, V, and W-phase lower arm switches SU2$n$, SV2*n*, and SW2*n* and the second low-potential path Ln2 are connected by electrical paths provided with second U, V, and W-phase current sensors DU2, DV2, and DW2, respectively. The second U, V, and W-phase current sensors DU2, DV2, and DW2 are configured to detect current flowing through the electrical paths and output the detected current as second U, V, and W-phase current Iur2, Ivr2, and Iwr2, respectively.

The electrifying circuit 30 includes a voltage sensor 32, an angle sensor 33, and a vehicle speed sensor 34. The voltage sensor 32 detects terminal voltage of the capacitor 31 as source voltage VDC. The angle sensor 33 outputs an angle signal according to the electrical angle θe of the rotation electric machine 20. The angle sensor 33 may include a magnet serving as a magnetism generator provided at a rotor of the rotation electric machine 20, and a magnetism detection element provided adjacent to the magnet. The vehicle speed sensor 34 detects a vehicle speed Vm of the vehicle 100. The voltage sensor 32, the angle sensor 33, the vehicle speed sensor 34, and the torque sensor 94 each output a signal received by an EPS ECU 60 included in the electrifying circuit 30.

The EPS ECU 60 is configured by a microcomputer, and operates the switches of the first and second inverters 40 and 50 to control the torque of the rotation electric machine 20 to reach a torque command value Tr*. The torque command value Tr* is set exemplarily in accordance with the steering torque Trq detected by the torque sensor 94. The EPS ECU 60 calculates the electrical angle θe of the rotation electric machine 20 in accordance with the signal output from the angle sensor 33. The EPS ECU 60 has a function that can be exerted by software recorded in a tangible memory device and a computer configured to execute the software, hardware, or a combination thereof. The EPS ECU 60 according to the present embodiment corresponds to a "controller" or a "rotation electric machine controller".

The rotation electric machine 20 will be described with reference to FIG. 3 in terms of torque control processing executed by the EPS ECU 60.

A two-phase converter 73 converts the U, V, and W-phase current Iur1, Ivr1, and Iwr1 in a three-phase fixed coordinate system of the rotation electric machine 20 to first d- and q-axis current Idr1 and Iqr1 in a two-phase rotary coordinate system (dq coordinate system) in accordance with the phase current Iur1, Ivr1, and Iwr1 detected by the current sensors for the first coil group M1 and the electrical angle θe. The two-phase converter 73 further converts the U, V, and W-phase current Iur2, Ivr2, and Iwr2 to second d- and q-axis current Idr2 and Iqr2 in the dq coordinate system in accordance with the phase current Iur2, Ivr2, and Iwr2 detected by the current sensors for the second coil group M2 and the electrical angle θe.

A second converter 74 converts the first and second d-axis current Idr1 and Idr2 to d-axis current Idr and differential d-axis current Idr# and outputs the obtained current. The d-axis current Idr is obtained by halving a value obtained through adding the first d-axis current Idr1 and the second d-axis current Idr2. The differential d-axis current Idr# is obtained by halving a value obtained through subtracting the second d-axis current Idr2 from the first d-axis current Idr1. The second converter 74 similarly converts the first and second q-axis current Iqr1 and Iqr2 to q-axis current Iqr and differential q-axis current Iqr# and outputs the obtained current.

A torque set portion 61 sets the torque command value Tr* in accordance with the steering torque Trq detected by the torque sensor 94. As indicated in FIG. 4, the torque set portion 61 stores a conversion table indicating relation between the steering torque Trq and basic assist torque Trk. The conversion table has relation that the basic assist torque Trk increases as the steering torque Trq increases. The torque set portion 61 acquires the basic assist torque Trk in accordance with the steering torque Trq with reference to the conversion table, and applies stabilization control such as differentiation control to the basic assist torque Trk thus acquired to set the torque command value Tr*. Examples of the stabilization control include the differentiation control for securing stability of the torque command value Tr*.

A torque command value limiter 62 limits the torque command value Tr* if the torque command value Tr* set by the torque set portion 61 is excessive. Specifically, the torque command value limiter 62 limits the torque command value Tr* in accordance with predetermined reference power in an exemplary case where the torque of the rotation electric machine 20 is controlled to be the torque command value Tr* and the battery 97 outputs power higher than the reference power. Examples of the reference power include normal rated power of the battery 97. The torque command value limiter 62 specifically limits the torque command value Tr* in accordance with temperature of the rotation electric machine 20, the first inverter 40, and the second inverter 50 in an exemplary case where these devices are overheating.

A current command value set portion 63 sets d- and q-axis current command values Id* and Iq* causing the sum of torque output from the first coil group M1 and the second coil group M2 to be equal to the torque command value Tr*, in accordance with the torque command value Tr* output from the torque command value limiter 62. The current command value set portion 63 sets the d- and q-axis current command values Id* and Iq* with reference to d- and q-axis torque maps MPd and MPp preliminarily stored in a storage 70 included in the EPS ECU 60. The d- and q-axis torque maps MPd and MPp provide map information including the d- and q-axis current command values Id* and Iq* prescribed to be in association with the torque command value Tr*. Examples of the storage 70 include a non-transitory tangible storage medium other than a ROM (e.g. a nonvolatile memory other than a ROM).

A d-axis current command value limiter 65 limits the d-axis current command value Id*, which is set by the current command value set portion 63, to a predetermined negative limit value Idm if the d-axis current command value Id* is less than the limit value Idm, in other words, if the negative d-axis current command value Id* has an absolute value more than an absolute value of the limit value Idm. The absolute value of the d-axis current command value Id* can thus become excessively large to inhibit overheat of the rotation electric machine 20, the first inverter 40, and the second inverter 50.

A FB controller 66 calculates d- and q-axis voltage command values Vd* and Vq* as control input for feedback control of the d- and q-axis current Idr and Iqr, which are output from the second converter 74, to the d- and q-axis current command values Id* and Iq*. Specifically, the FB controller 66 calculates d- and q-axis current deviations ΔId and ΔIq as values obtained by subtracting the d- and q-axis current Idr and Iqr from the d- and q-axis current command values Id* and Iq*. The FB controller 66 calculates the d- and q-axis voltage command values Vd* and Vq* as control input for feedback control of the calculated d- and q-axis current deviations ΔId and ΔIq to zero. The FB controller 66 further calculates differential d- and q-axis voltage command values Vd#* and Vq#* as control input for feedback control of the differential d- and q-axis current Idr# and Iqr#, which are output from the second converter 74, to zero. Examples of the feedback control executed by the FB controller 66 include proportional integral control.

A first converter 67 converts the d-axis voltage command value Vd* and the differential d-axis voltage command value Vd#* to a first d-axis voltage command value Vd1* for the first coil group M1 and a second d-axis voltage command value Vd2* for the second coil group M2. The first and second d-axis voltage command values Vd1* and Vd2* are exemplarily obtained by halving a value obtained through adding the d-axis voltage command value Vd* and the differential d-axis voltage command value Vd#*. The first converter 67 similarly converts the q-axis voltage command value Vq* and the differential q-axis voltage command value Vq#* to a first q-axis voltage command value Vq1* for the first coil group M1 and a second q-axis voltage command value Vq2* for the second coil group M2.

A three-phase converter 68 converts the first d- and q-axis voltage command values Vd1* and Vq1* in a two-phase fixed coordinate system of the rotation electric machine 20 to first U, V, and W-phase voltage command values Vu1, Vv1, and Vw1 in the three-phase fixed coordinate system in accordance with the first d- and q-axis voltage command values Vd1* and Vq1* output from the first converter 67 and the electrical angle θe. The three-phase converter 68 similarly converts the second d- and q-axis voltage command values Vd2* and Vq2* in the two-phase fixed coordinate system of the rotation electric machine 20 to second U, V, and W-phase voltage command values Vu2, Vv2, and Vw2 in the three-phase fixed coordinate system in accordance with the second d- and q-axis voltage command values Vd2* and Vq2* output from the first converter 67 and the electrical angle θe. According to the present embodiment, the first U, V, and W-phase voltage command values Vu1, Vv1, and Vw1 serve as sinusoidal signals having phases shifted from one another by 120 degrees in terms of the electrical angle θe, and the second U, V, and W-phase voltage command values Vu2, Vv2, and Vw2 serve as sinusoidal signals having phases shifted from one another by 120 degrees in terms of the electrical angle θe.

A first modulator 71 generates drive signals causing the switches SU1p to SW1n of the first inverter 40 to be turned ON or OFF through sinusoidal PWM control, in accordance with a carrier signal such as a triangular wave signal, the first U, V, and W-phase voltage command values Vu1, Vv1, and Vw1 output from the three-phase converter 68, and the source voltage VDC. The first modulator 71 generates the drive signals causing the switches SU1p to SW1n of the first inverter 40 to be turned ON or OFF for control of the actual d-axis current Idr to the d-axis current command value Id* output from the d-axis current command value limiter 65.

The sinusoidal PWM control specifically includes generating the drive signals in accordance with comparison in magnitude between values obtained by dividing the first U, V, and W-phase voltage command values Vu1, Vv1, and Vw1 by "VDC/2" and the carrier signal. A second modulator 72 similarly generates drive signals causing the switches SU2p to SW2n of the second inverter 50 to be turned ON or OFF through the sinusoidal PWM control, in accordance with the carrier signal, the second U, V, and W-phase voltage command values Vu2, Vv2, and Vw2 output from the three-phase converter 68, and the source voltage VDC. The first modulator 71 and the second modulator 72 according to the present embodiment each correspond to an "operation portion".

A d-axis current command value set portion 81 sets the d-axis current command value Id* such that a voltage vector determined in accordance with the first d- and q-axis voltage command values Vd1* and Vq1* output from the first converter 67 has magnitude not exceeding a voltage maximum value Vmax. The d-axis current command value set portion 81 further sets the negative d-axis current command value Id* such that a voltage vector determined in accordance with the second d- and q-axis voltage command values Vd2* and Vq2* output from the first converter 67 has magnitude not exceeding the voltage maximum value Vmax. The voltage maximum value Vmax has the maximum value of voltage that can be output from the first and second inverters 40 and 50 to the first and second coil groups M1 and M2, respectively. The d-axis current command value set portion 81 according to the present embodiment corresponds to a "d-axis command value set portion".

Specifically, the d-axis current command value set portion 81 calculates a saturation factor Ran obtained by dividing an n-th q-axis voltage command value Vqn* by a square root Hen of a value obtained through subtracting a square of an n-th d-axis voltage command value Vdn* (n=1, 2) from a square of the voltage maximum value Vmax. The square root Hen and the saturation factor Ran are expressed by equations 1 and 2, respectively.

$$Hen = \sqrt{(Vmax^2 - Vdn^{*2})} \quad \text{(Equation 1)}$$

$$Ran = Vqn^*/Hen = Vqn^*/\sqrt{(Vmax^2 - Vdn^{*2})} \quad \text{(Equation 2)}$$

The d-axis current command value set portion 81 sets the negative d-axis current command value Id* in accordance with a difference between the saturation factor Ran and a predetermined target saturation factor Rtgn such that the saturation factor Ran reaches the target saturation factor Rtgn. The predetermined target saturation factor Rtgn has a prescribed value such as a value from 0.8 to 0.9. In the present embodiment, the saturation factor Ran corresponds to a "correlation value or the q-axis parameter", and the target saturation factor Rtgn corresponds to a "target value".

Specifically, the d-axis current command value set portion 81 sets the negative d-axis current command value Id* as control input for feedback control of the saturation factor Ran to the target saturation factor Rtgn, such that the absolute value of the d-axis current command value Id* increases if the saturation factor Ran is less than the target saturation factor Rtgn. The d-axis current command value set portion 81 sets the d-axis current command value such that the absolute value of the d-axis current command value Id* decreases if the saturation factor Ran is more than the target saturation factor Rtgn. The d-axis current command value Id* set by the d-axis current command value set portion 81 will be hereinafter referred to as a second d-axis current command value Id*2.

A limit value set portion 82 sets the negative limit value Idm in accordance with the torque command value Tr* output from the d-axis current command value set portion 81. Specifically, the limit value set portion 82 selects one of multiple negative limit values Idm associated with the q-axis current Iqr output from the second converter 74, in accordance with the torque command value Tr*. The limit value set portion 82 sets, as the limit value Idm, one having a smaller absolute value out of the selected limit value Idm and the negative second d-axis current command value Id*2 output from the d-axis current command value set portion 81, and transmits the limit value Idm thus set to the d-axis current command value limiter 65.

When the driver rapidly rotates the steering wheel 90, the rotation electric machine 20 has electrical angle speed ω increased as the torque command value Tr* increases. The rotation electric machine 20 has induced voltage that is in proportion to the electrical angle speed ω and is generated at the q-axis about which the torque of the rotation electric machine 20 generates. The q-axis current Iqr thus decreases as the electrical angle speed ω increases, to decrease the maximum value of the torque that can be generated by the rotation electric machine 20. In a state where the maximum value of the torque that can be generated by the rotation electric machine 20 is less than the torque command value Tr* (hereinafter, called a voltage saturated state), the rotation electric machine 20 fails to output torque according to the torque command value Tr*.

In a case where the rotation electric machine 20 has a non-salient pole structure and the first coil group M1 is exemplified, q-axis voltage Vdr is expressed by an equation 3 including the electrical angle speed ω. As expressed in the equation 3, at the q-axis voltage Vdr, the induced voltage included in a second member on a right side increases in accordance with the electrical angle speed ω whereas the q-axis current Iqr included in a first member on the right side decreases. The equation 3 includes R indicating a resistance value of the first coil group M1, φ indicating an induced voltage constant of the rotation electric machine 20, and Ld indicating d-axis inductance of the rotation electric machine 20.

$$Vdr1=R\times Iqr+\omega\times(\Phi+Ld\times Idr) \quad \text{(Equation 3)}$$

Field weakening control has been known as a technique of decreasing the induced voltage according to the electrical angle speed ω in the voltage saturated state. The field weakening control can cause the d-axis current Idr to have a predetermined negative value to achieve decrease in induced voltage.

Feedback control of the saturation factor Ran to the target saturation factor Rtgn needs change of the d-axis current command value Id* as control input. A low change rate of the d-axis current command value Id* fails to cause the saturation factor Ran to decrease rapidly and lead to deterioration in responsiveness of the saturation factor Ran, or torque responsiveness of the rotation electric machine 20.

Feedback control of the saturation factor Ran to the target saturation factor Rtgn has switching between increase and decrease of the d-axis current command value Id* according to magnitude relation between the saturation factor Ran and the target saturation factor Rtgn. A high change rate of the d-axis current command value Id* causes hunting of the d-axis current command value Id* and deterioration in torque controllability of the rotation electric machine 20 in a range where the magnitude relation between the saturation factor Ran and the target saturation factor Rtgn switches.

The present embodiment includes control processing. The control processing includes setting the d-axis current command value Id* such that the change rate of the d-axis current command value Id* is higher in a case where the saturation factor Ran is more than the target saturation factor Rtgn by a reference value Rk than in another case where the saturation factor Ran is less than the target saturation factor Rtgn by the reference value Rk. In the case where the saturation factor Ran is more than the target saturation factor Rtgn by the reference value Rk, the absolute value of the negative d-axis current command value Id* can thus be increased rapidly at a relatively high change rate. In the other case where the saturation factor Ran is less than the target saturation factor Rtgn by the reference value Rk, the absolute value of the negative d-axis current command value Id* can be decreased slowly at a relatively low change rate to inhibit hunting of the d-axis current command value Id*. It may be possible to improve torque controllability of the rotation electric machine 20.

Figure 5:
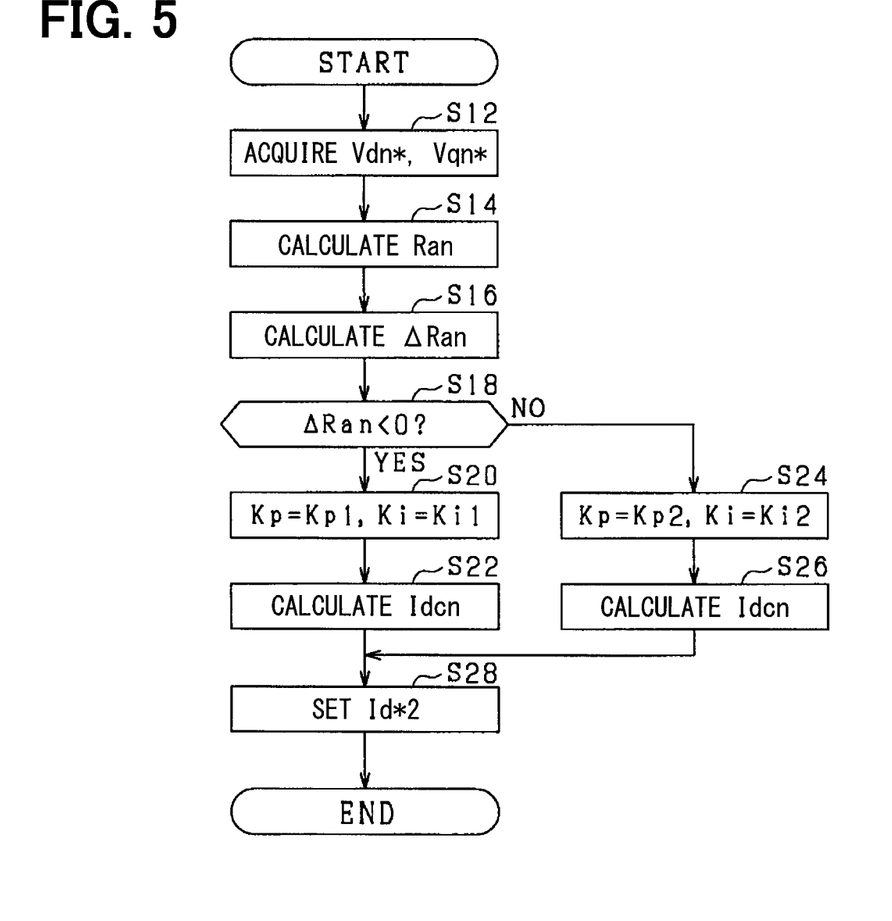
FIG. 5 is a flowchart of control processing.

FIG. 5 is a flowchart of the control processing according to the present embodiment. This control processing is repetitively executed at predetermined time intervals by, for example, the EPS ECU 60.

The control processing initially includes S12 of acquiring the first d- and q-axis voltage command values Vd1* and Vq1* and the second d- and q-axis voltage command values Vd2* and Vq2* from the first converter 67.

S14 includes calculating the saturation factor Ran. The saturation factor Ran is calculated in accordance with the equation 3. Subsequent S16 includes calculating a differential saturation factor ΔRan. The differential saturation factor ΔRan is obtained by subtracting the saturation factor Ran calculated in S12 from the target saturation factor Rtgn, and is expressed by an equation 4.

$$\Delta Ran=Rtgn-Ran \quad \text{(Equation 4)}$$

The processing in S14 may correspond to a "saturation factor calculator".

S18 to S28 include setting the negative d-axis current command value Id* in accordance with the differential saturation factor ΔRan calculated in S14. Specifically, S18 to S28 include setting a proportional gain Kp and an integral gain Ki for feedback control of the saturation factor Ran to the target saturation factor Rtgn in accordance with the differential saturation factor ΔRan, and setting the d-axis current command value Id* with reference to the proportional gain Kp and the integral gain Ki thus set. The proportional gain Kp and the integral gain Ki according to the present embodiment each correspond to a "feedback gain".

Specifically, S18 includes determining whether the differential saturation factor ΔRan is less than zero. In a case where positive determination is made in S18, in other words, when the saturation factor Ran is more than the target saturation factor Rtgn, the proportional gain Kp and the integral gain Ki for feedback control are set to a first proportional gain Kp1 and a first integral gain Ki1, respectively, in S20. Subsequent S22 includes calculating first and second d-axis current candidate values Idc1 and Idc2 for the first and second coil groups M1 and M2 in accordance with the differential saturation factor ΔRan and the gains Kp1 and Ki1 set in S20. S18 includes calculating an n-th d-axis current candidate value Idcn (n=1, 2) expressed by an equation 5.

$$Idcn=Kp1\Delta Ran+Ki1\times\int(\Delta Ran)dt \quad \text{(Equation 5)}$$

In another case where negative determination is made in S18, in other words, when the saturation factor Ran is equal to or less than the target saturation factor Rtgn, the proportional gain Kp and the integral gain Ki are set to a second proportional gain Kp2 and a second integral gain Ki2, respectively, in S24. Subsequent S26 includes calculating the first and second d-axis current candidate values Idc1 and Idc2 for the first and second coil groups M1 and M2 in accordance with the differential saturation factor ΔRan and the gains Kp2 and Ki2 set in S24. The n-th d-axis current candidate value Idcn calculated in S26 is expressed by an equation 6.

$$Idcn=Kp2\times\Delta Ran+Ki2\times\int(\Delta Ran)dt \quad \text{(Equation 6)}$$

S28 includes selecting the maximum value of the first and second d-axis current candidate values Idc1 and Idc2 thus calculated, setting the d-axis current candidate value thus selected as the second d-axis current command value Id*2, and ending the control processing.

Relation between the differential saturation factor ΔRan and the first and second proportional gains Kp1 and Kp2 will be described next with reference to FIG. 6. The differential saturation factor ΔRan and the first and second integral gains Ki1 and Ki2 have relation, which is similar to the relation between the differential saturation factor ΔRan and the first and second proportional gains Kp1 and Kp2 and will not be described.

Figure 6:
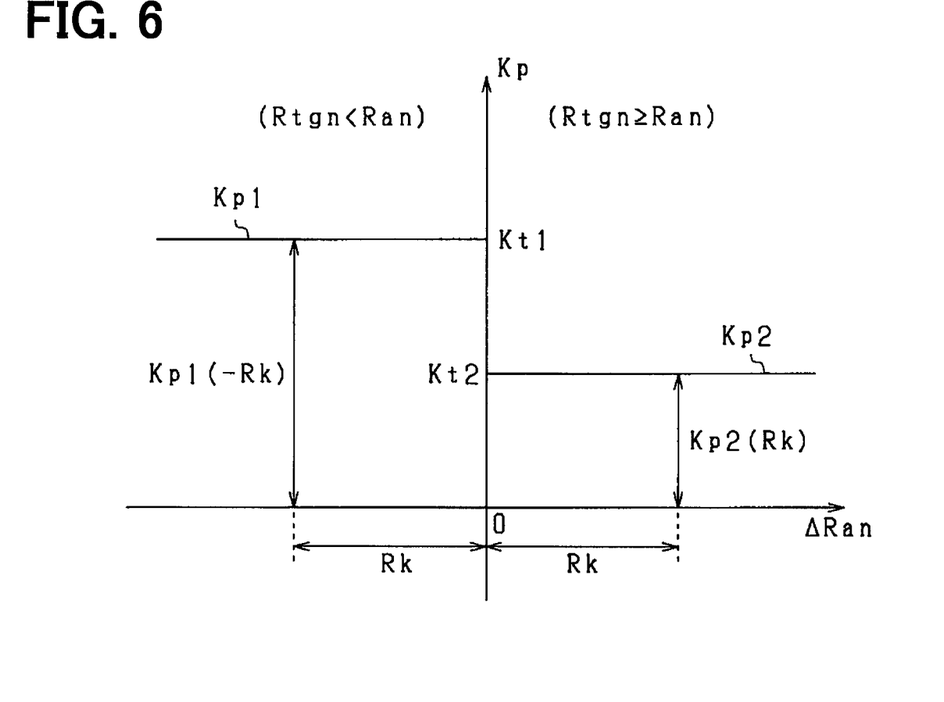
FIG. 6 is a graph indicating relation between a differential saturation factor and first and second proportional gains according to the first embodiment.

As indicated in FIG. 6, the first and second proportional gains Kp1 and Kp2 each have a positive constant value. The first proportional gain Kp1 is set to a first gain value Kt1 whereas the second proportional gain Kp2 is set to a second gain value Kt2 that is less than the first gain value Kt1. Specifically, the first gain value Kt1 is exemplarily set to twice the second gain value Kt2. As indicated in FIG. 6, the first proportional gain Kp1 for a case where the differential saturation factor ΔRan has the negative reference value "−Rk" is thus more than the second proportional gain Kp2 for another case where the differential saturation factor ΔRan has the positive reference value "Rk".

Figure 7A:
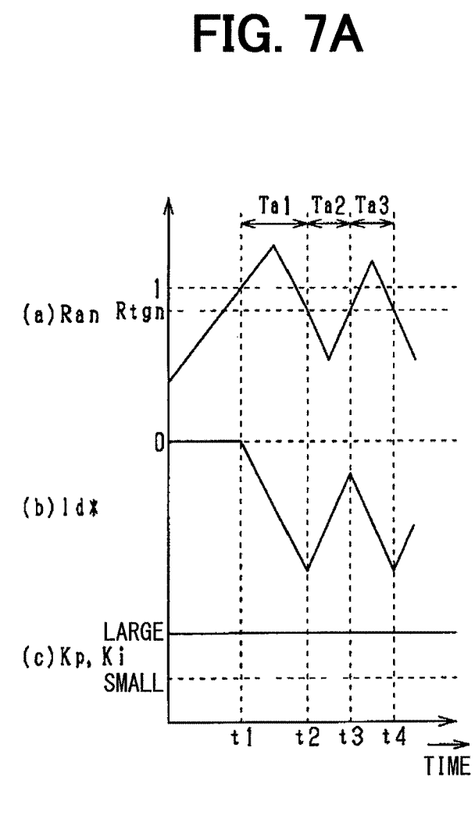
FIG. 7A to FIG. 7C are graphs indicating torque response time of the rotation electric machine.
Figure 7B:
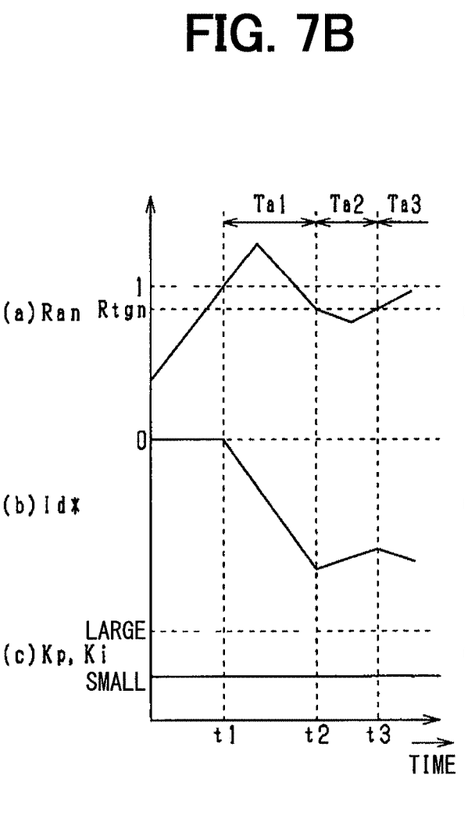
Figure 7C:
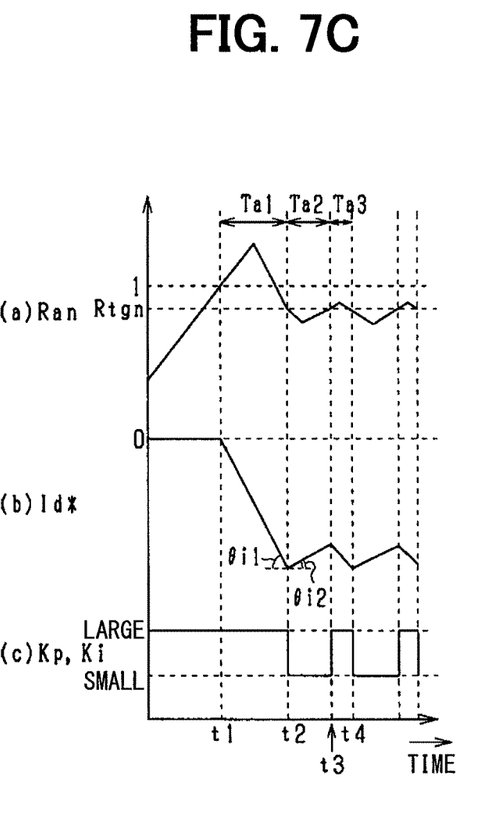

The torque controllability of the rotation electric machine 20 will be described with reference to FIG. 7A to FIG. 7C. FIG. 7A relates to a case where the proportional gain Kp is set to the first proportional gain Kp1 independently from the differential saturation factor ΔRan. FIG. 7B relates to a case where the proportional gain Kp is set to the second proportional gain Kp2 independently from the differential saturation factor ΔRan. FIG. 7C relates to a case where the proportional gain Kp is set to the first proportional gain Kp1 or the second proportional gain Kp2 in accordance with the differential saturation factor ΔRan, and corresponds to the configuration according to the present embodiment. FIG. 7A to FIG. 7C each include a line (a) indicating change of the saturation factor Ran, a line (b) indicating change of the d-axis current command value Id*, and a line (c) indicating magnitude change of the proportional gain Kp and the integral gain Ki. The following description will be made to the proportional gain Kp, and the integral gain Ki will not be described.

As indicated in FIG. 7A, the control processing starts when the saturation factor Ran increases and reaches one at time t1, in other words, when voltage is saturated. The control processing includes setting the d-axis current command value such that the d-axis current command value Id* decreases in the case where the saturation factor Ran is more than the target saturation factor Rtgn set to be less than "one" in a period Ta1 from the time t1 to time t2 and a period Ta3 from time t3 to time t4. The control processing also includes setting the d-axis current command value such that the d-axis current command value Id* increases in the other case where the saturation factor Ran is less than the target saturation factor Rtgn in a period Ta2 from the time t2 to the time t3.

In a case where the first proportional gain Kp1 and the second proportional gain Kp2 are each set to a large value, the d-axis current command value Id* excessively increases or decreases due to the relatively large proportional gain Kp in a range where the magnitude relation between the saturation factor Ran and the target saturation factor Rtgn switches at the time t2, the time t3, and the time t4. This causes hunting of the d-axis current command value Id*. This leads to deterioration in torque controllability of the rotation electric machine 20.

In another case where the first proportional gain Kp1 and the second proportional gain Kp2 are each set to a small value as indicated in FIG. 7B, the d-axis current command value Id* cannot be decreased rapidly during the period Ta1 that is accordingly extended. The saturation factor Ran accordingly has extended response time. This causes deterioration in torque responsiveness of the rotation electric machine 20.

In contrast, the present embodiment includes setting the first proportional gain Kp1 to be more than the second proportional gain Kp2. Specifically, assume that the d-axis current command value Id* being decreased has inclination θi1 and the d-axis current command value Id* being increased has inclination θi2. The inclination θi1 is made to have an absolute value more than an absolute value of the inclination θi2. The absolute value of each of the inclination θi1 and the inclination θi2 according to the present embodiment corresponds to a "change rate". A change rate may be referred to as a change speed.

In the case where the saturation factor Ran is more than the target saturation factor Rtgn during the period Ta1 or the period Ta3, it may be possible to rapidly decrease the d-axis current command value Id* at the inclination θi1 as indicated in FIG. 7C. It may be possible to shorten the response time of the saturation factor Ran. In the other case where the saturation factor Ran is less than the target saturation factor Rtgn during the period Ta2, it may be possible to inhibit the d-axis current command value Id* from hunting by being increased at the inclination θi2. It may be possible to improve torque controllability of the rotation electric machine 20.

The present embodiment described in detail above achieves the following effect, for example.

The d-axis current command value Id* according to the present embodiment is set to a negative value in accordance with the difference between the saturation factor Ran and the target saturation factor Rtgn. Specifically, the absolute value of the inclination θi1 of decreasing d-axis current command value Id* in the case where the saturation factor Ran is more than the target saturation factor Rtgn is made larger than the absolute value of the inclination θi2 of increasing d-axis current command value Id* in the other case where the saturation factor Ran is less than the target saturation factor Rtgn. It may be possible to improve torque controllability of the rotation electric machine 20.

The rotation electric machine 20 needs to have the d-axis current command value Id* set to a negative value particularly when the saturation factor Ran is more than "one" in the voltage saturated state. The d-axis current command value Id* according to the present embodiment can be changed rapidly in the voltage saturated state so that the voltage saturated state can thus be cancelled soon.

The present embodiment includes feedback control of the saturation factor Ran to the target saturation factor Rtgn. As to the proportional gain Kp, the first proportional gain Kp1 for the case where the differential saturation factor ΔRan has the negative reference value "−Rk" is set to be more than the second proportional gain Kp2 in the other case where the differential saturation factor ΔRan has the positive reference value "Rk". This allows the absolute value of the inclination θi1 to be more than the absolute value of the inclination θi2. It may be possible to improve torque controllability of the rotation electric machine 20.

Specifically, the first proportional gain Kp1 for the case where the saturation factor Ran is more than the target saturation factor Rtgn and the second proportional gain Kp2 for the other case where the saturation factor Ran is less than the target saturation factor Rtgn are each made to have a positive constant value, and the first proportional gain Kp1 is set to be more than the second proportional gain Kp2. This allows the absolute value of the inclination θi1 to be more than the absolute value of the inclination θi2 independently from the reference value Rk. The same applies to the integral gain Ki.

SECOND EMBODIMENT

The second embodiment will be described below with reference to the drawings in terms of differences from the first embodiment.

Figure 8:
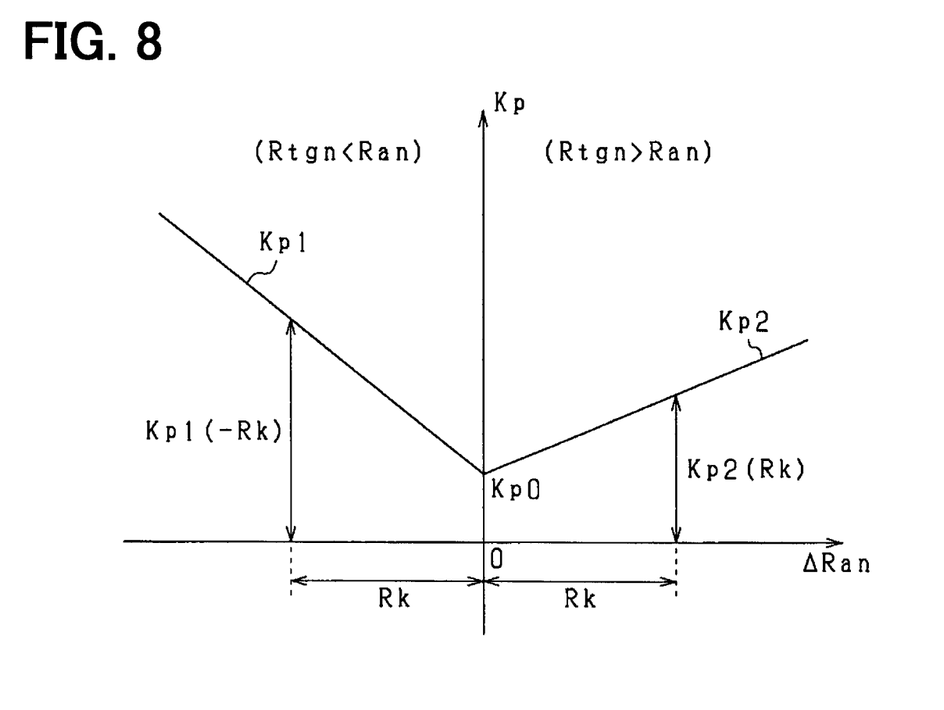
FIG. 8 is a graph indicating relation between a differential saturation factor and first and second proportional gains according to a second embodiment.

As indicated in FIG. 8, the present embodiment has different relation between the differential saturation factor ΔRan and the first and second proportional gains Kp1 and Kp2 as well as the first and second integral gains Ki1 and Ki2.

The proportional gain Kp according to the present embodiment is set to a reference proportional gain Kp0 in a case where the differential saturation factor ΔRan is zero. In another case where the differential saturation factor ΔRan is less than zero, in other words, when the saturation factor Ran is more than the target saturation factor Rtgn, the proportional gain Kp is set to the first proportional gain Kp1 that is more than the reference proportional gain Kp0. The first proportional gain Kp1 is set to a larger value as the differential saturation factor ΔRan has a larger absolute value. When the differential saturation factor ΔRan is less than zero, the first proportional gain Kp1 changes in proportion to the absolute value of the differential saturation factor ΔRan.

In another case where the differential saturation factor ΔRan is more than zero, in other words, when the saturation factor Ran is less than the target saturation factor Rtgn, the proportional gain Kp is set to the second proportional gain Kp2 that is more than the reference proportional gain Kp0. The second proportional gain Kp2 is set to a larger value as the differential saturation factor ΔRan has a larger absolute value. When the differential saturation factor ΔRan is more than zero, the second proportional gain Kp2 changes in proportion to the differential saturation factor ΔRan.

In the present embodiment, the first proportional gain Kp1 increases per unit amount of the absolute value of the differential saturation factor ΔRan being less than zero, by an amount of increase that is more than an amount of increase of the second proportional gain Kp2 per unit amount of the differential saturation factor ΔRan being more than zero. Specifically, the amount of increase of the first proportional gain Kp1 per unit amount of the absolute value of the differential saturation factor ΔRan is exemplarily set to twice the amount of increase of the second proportional gain Kp2 per unit amount of the differential saturation factor ΔRan. As indicated in FIG. 6, the first proportional gain Kp1 for the case where the differential saturation factor ΔRan has the negative reference value "−Rk" is thus more than the second proportional gain Kp2 in the other case where the differential saturation factor ΔRan has the positive reference value "Rk". The same applies to the integral gain Ki and no description will be made to the integral gain Ki.

As described above, the present embodiment includes setting the amount of increase of the first proportional gain Kp1 per unit amount of the absolute value of the differential saturation factor ΔRan for the case where the saturation factor Ran is more than the target saturation factor Rtgn, to be more than the amount of increase of the second proportional gain Kp2 per unit amount of the differential saturation factor ΔRan for the other case where the saturation factor Ran is less than the target saturation factor Rtgn. The first and second proportional gains Kp1 and Kp2 can thus be made larger in a case where the reference value Rk has a large absolute value than in another case where the reference value Rk has a small absolute value. It may be possible to improve torque controllability of the rotation electric machine 20. The same applies to the integral gain Ki.

OTHER EMBODIMENTS

The present disclosure is not limited to those described in the above embodiments, but may alternatively be embodied as follows.

The rotation electric machine is not limitedly applicable to the EPS device.

The rotation electric machine may alternatively include only one coil group.

Figure 3:
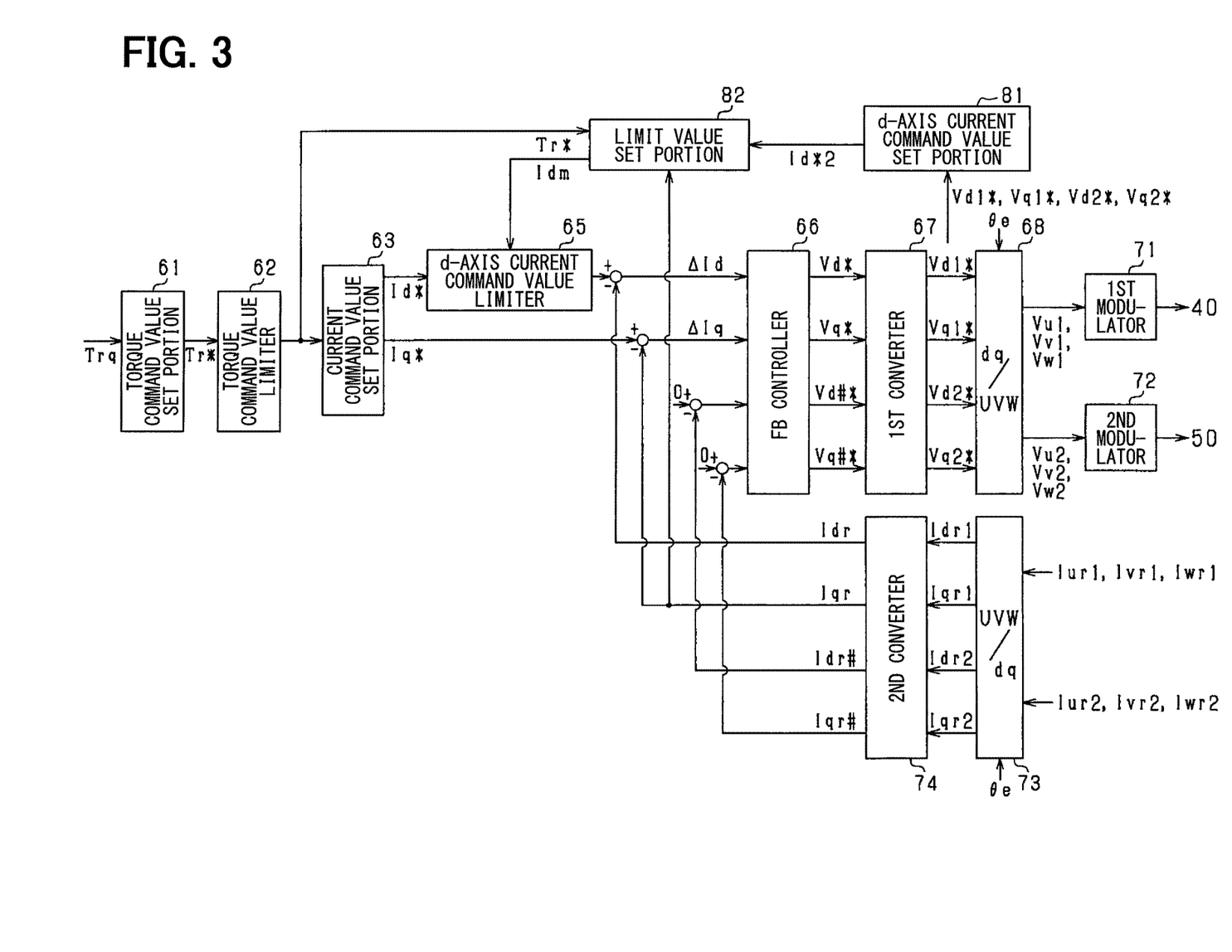
FIG. 3 is a circuit configuration diagram of an EPS ECU according to a first embodiment.
Figure 4:
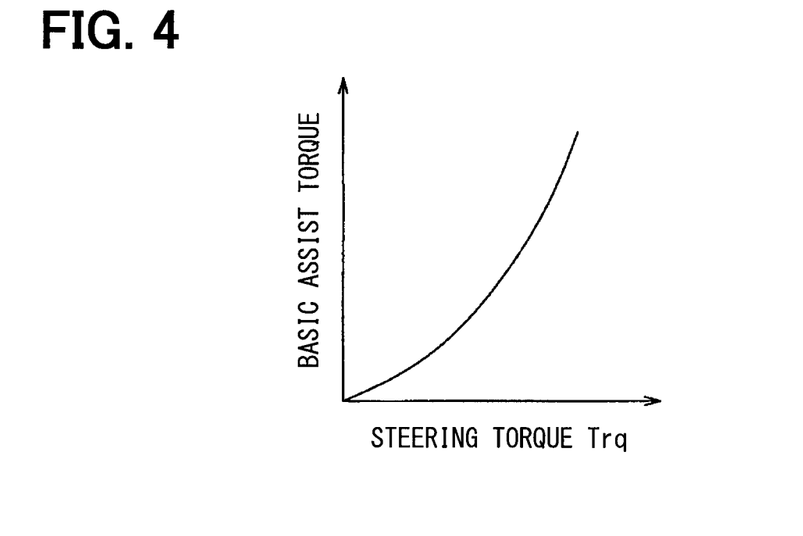
FIG. 4 is a graph indicating relation between steering torque and basic assist torque.
Figure 9:
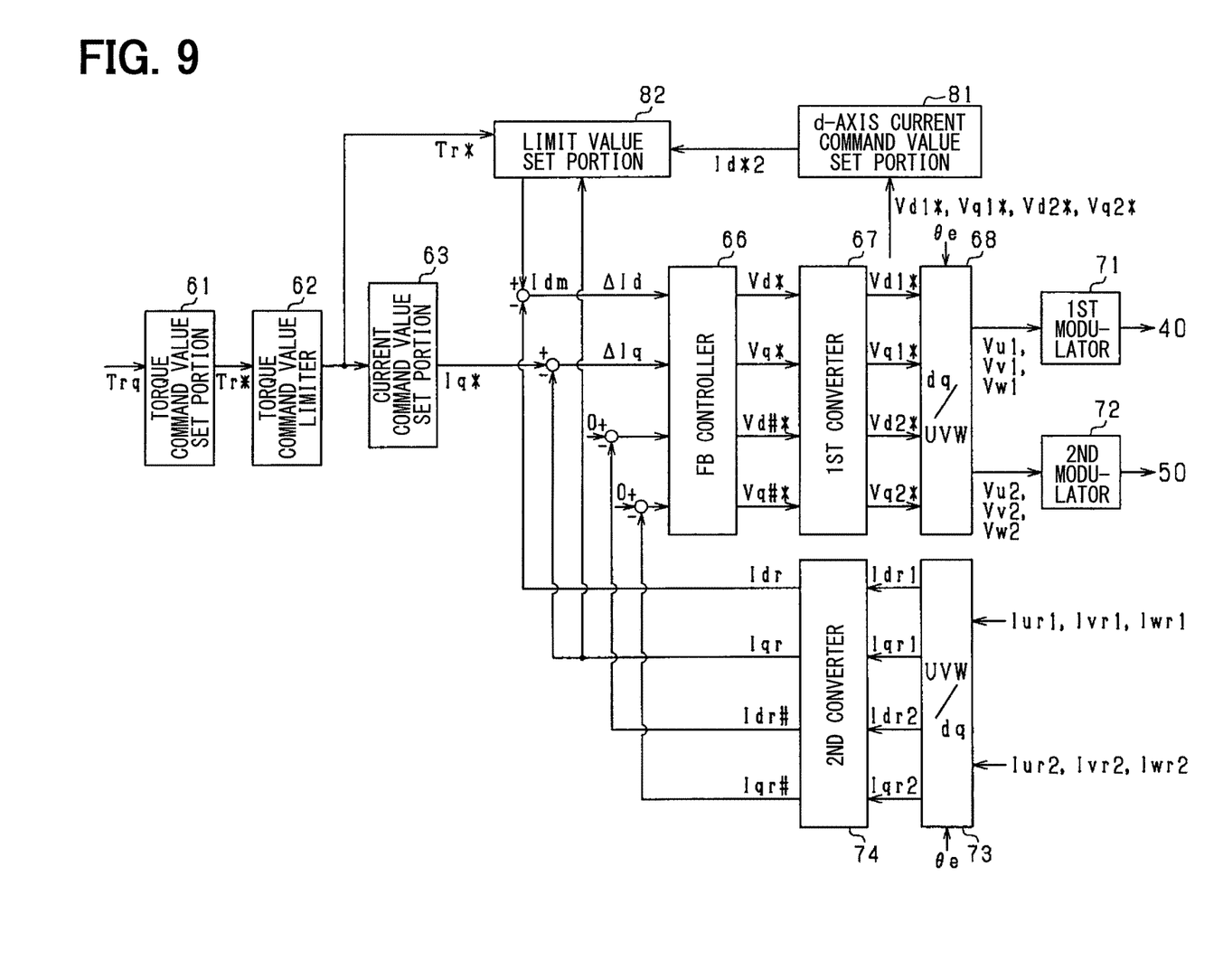
FIG. 9 is a circuit configuration diagram of an EPS ECU according to a different embodiment.

FIG. 3 merely exemplifies the circuit configuration of the EPS ECU 60. The rotation electric machine 20 having the non-salient pole structure does not necessarily include the d-axis current command value limiter 65. FIG. 9 depicts a circuit configuration of the EPS ECU 60 for the rotation electric machine 20 having the non-salient pole structure. The current command value set portion 63 sets the q-axis current command value Iq* in accordance with the torque command value Tr*, without setting the d-axis current command value Id*.

The FB controller 66 calculates the d-axis voltage command value Vd* as control input for feedback control of the d-axis current Idr output from the second converter 74, to the limit value Idm output from the limit value set portion 82.

The q-axis parameter is not limited to the saturation factor Ran but may alternatively adopt the first q-axis voltage command value Vq1* or the second q-axis voltage command value Vq2*. Exemplarily, the d-axis current command value set portion 81 calculates a q-axis voltage target value Vtgn obtained through multiplying the square root Hen by the target saturation factor Rtgn. The d-axis current command value set portion 81 sets the negative d-axis current command value Id* in accordance with a difference between the n-th q-axis voltage command value Vqn* and the q-axis voltage target value Vtgn such that the n-th q-axis voltage command value Vqn* reaches the q-axis voltage target value Vtgn.

Specifically, the d-axis current command value set portion 81 sets the negative d-axis current command value Id* as control input for feedback control of the n-th q-axis voltage command value Vqn* to the q-axis voltage target value Vtgn. The d-axis current command value set portion 81 sets the d-axis current command value such that the absolute value of the d-axis current command value Id* increases in a case where the n-th q-axis voltage command value Vqn* is more than the q-axis voltage target value Vtgn. The d-axis current command value set portion 81 sets the d-axis current command value such that the absolute value of the d-axis current command value Id* decreases in another case where the n-th q-axis voltage command value Vqn* is less than the q-axis voltage target value Vtgn.

The feedback gain for feedback control is not limited to the proportional gain Kp or the integral gain Ki. The feedback gain may alternatively have a derivative gain. The feedback gain has only to include at least one of the proportional gain Kp, the integral gain Ki, and the derivative gain.

The saturation factor Ran may be controlled to be the target saturation factor Rtgn in a manner other than feedback control. For control of the d-axis current command value Id*, the d-axis current command value Id* may exemplarily have a renewed value Rw set in accordance with the differential saturation factor ΔRan, and the d-axis current command value Id* may be renewed through addition of the renewed value Rw to the d-axis current command value Id* at the moment. A d-axis current command value Id*(new) after the renewal is expressed by an equation 7 including a d-axis current command value Id*(old) before the renewal.

$$Id^*(\text{new}) = Id^*(\text{old}) + Rw \quad \text{(Equation 7)}$$

Figure 10:
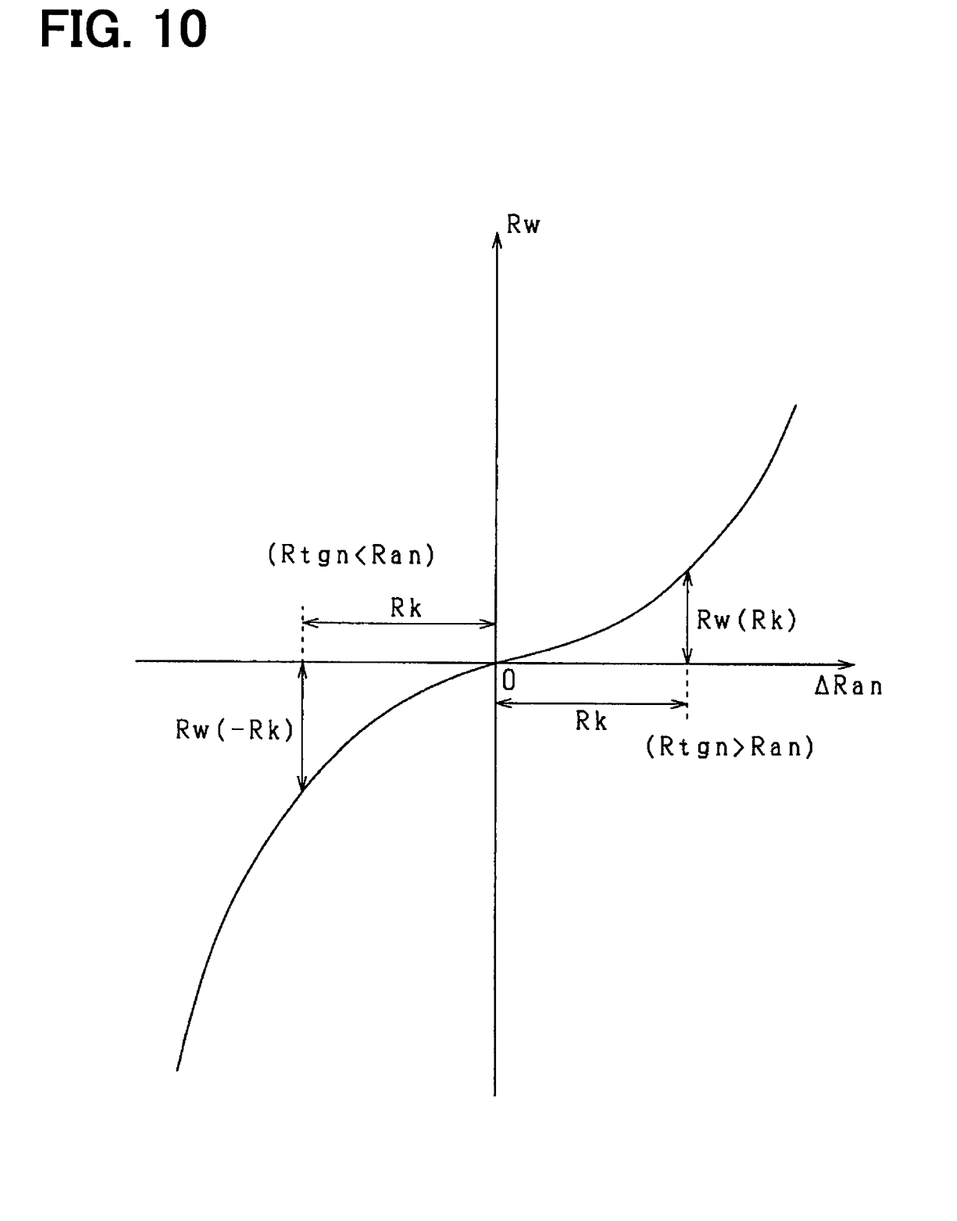
FIG. 10 is a graph indicating relation between a differential saturation factor and a renewed value.

FIG. 10 indicates relation between the differential saturation factor ΔRan and the renewed value Rw. As indicated in FIG. 10, the renewed value Rw decreases as the differential saturation factor ΔRan decreases in the case where the differential saturation factor ΔRan is less than zero, in other words, when the target saturation factor Rtgn is less than the saturation factor Ran. The renewed value Rw increases as the differential saturation factor ΔRan increases in the other case where the differential saturation factor ΔRan is more than zero, in other words, when the target saturation factor Rtgn is more than the saturation factor Ran.

As indicated in FIG. 10, the renewed value Rw according to the present embodiment has a larger absolute value in the case where the differential saturation factor ΔRan has the negative reference value "−Rk" than in the other case where the differential saturation factor ΔRan has the positive reference value "Rk". It may be possible to improve torque controllability of the rotation electric machine 20.

It is noted that a flowchart or the processing of the flowchart in the present application includes multiple steps (also referred to as sections), each of which is represented, for instance, as S12. Further, each step can be divided into several sub-steps while several steps can be combined into a single step.

Controllers and methods described in the present disclosure may be implemented by a special purpose computer created by configuring a memory and a processor programmed to execute one or more particular functions embodied in computer programs. Alternatively, the control units, the controllers and the methods described in the present disclosure may be implemented by a special purpose computer created by configuring a processor provided by one or more special purpose hardware logic circuits. Further alternatively, the control units, the controllers and the methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

While various embodiments, configurations, and aspects of a rotation electric machine controller according to the present disclosure have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects of the present disclosure.

What is claimed is:

1. A rotation electric machine controller that is applied to a system including a rotation electric machine and a power converter electrically connected to the rotation electric machine, the rotation electric machine controller comprising:

a d-axis command value set portion that sets a negative d-axis current command value in accordance with a difference between a q-axis parameter that is a q-axis voltage command value of the rotation electric machine or a correlation value of the q-axis voltage command value, and a target value of the q-axis parameter; and an operation portion that is configured to operate the power converter to control a d-axis current to the d-axis current command value, which is set, wherein:

the d-axis command value set portion increases an absolute value of the d-axis current command value in response to that the q-axis parameter is larger than the target value;

the d-axis command value set portion decreases the absolute value of the d-axis current command value in response to that the q-axis parameter is less than the target value; and the d-axis command value set portion sets the d-axis current command value, causing the d-axis current command value to have a higher change rate in a case where the q-axis parameter is more than the target value by a reference value than in a different case where the q-axis parameter is less than the target value by the reference value.

2. The rotation electric machine controller according to claim 1, wherein:

the d-axis command value set portion sets the d-axis current command value as a control input for a feedback control of the q-axis parameter to the target value; and the feedback control has a feedback gain that is set to be larger in the case where the q-axis parameter is more than the target value by the reference value than in the different case where the q-axis parameter is less than the target value by the reference value.

3. The rotation electric machine controller according to claim 2, wherein:

the feedback gain for a case where the difference has an absolute value increased by unit amount has a larger amount of increase in a case where the q-axis parameter is more than the target value than in another case where the q-axis parameter is less than the target value.

4. The rotation electric machine controller according to claim 2, wherein:

the feedback gain is set to a first gain value having a constant value when the q-axis parameter is more than the target value; and the feedback gain is set to a second gain value having a constant value and being less than the first gain value, when the q-axis parameter is less than the target value.

5. The rotation electric machine controller according to claim 1, the rotation electric machine controller further comprising:

a saturation factor calculator that is configured to calculate, as the q-axis parameter, a saturation factor obtained through dividing the q-axis voltage command value by a square root of a value obtained through subtracting a square of a d-axis voltage command value of the rotation electric machine from a square of a voltage maximum value of the power converter, wherein:

the d-axis command value set portion sets the d-axis current command value in accordance with a difference between the saturation factor and a target saturation factor obtained by dividing a q-axis voltage target value of the rotation electric machine by the square root of the value.

6. A rotation electric machine controller comprising:
at least one ECU that is configured to set a negative d-axis current command value in accordance with a difference between a q-axis parameter that is a q-axis voltage command value of a rotation electric machine or a correlation value of the q-axis voltage command value, and a target value of the q-axis parameter, and to operate a power converter to control a d-axis current to the d-axis current command value, which is set, wherein:
the rotation electric machine controller is applied to a system including the rotation electric machine and the power converter electrically connected to the rotation electric machine;
the ECU increases an absolute value of the d-axis current command value in response to that the q-axis parameter is larger than the target value;
the ECU decreases the absolute value of the d-axis current command value in response to that the q-axis parameter is less than the target value; and
the ECU sets the d-axis current command value, causing the d-axis current command value to have a higher change rate in a case where the q-axis parameter is more than the target value by a reference value than in a different case where the q-axis parameter is less than the target value by the reference value.

* * * * *